(12) United States Patent
Shono

(10) Patent No.: US 7,064,789 B1
(45) Date of Patent: Jun. 20, 2006

(54) DIGITAL CAMERA HAVING A TILTING/SWINGING MECHANISM

(75) Inventor: Tetsuji Shono, Saitama (JP)

(73) Assignee: PENTAX Corporation, Tokyo (JP)

( * ) Notice: Subject to any disclaimer, the term of this patent is extended or adjusted under 35 U.S.C. 154(b) by 589 days.

(21) Appl. No.: 09/665,412

(22) Filed: Sep. 20, 2000

(30) Foreign Application Priority Data

Sep. 21, 1999 (JP) ................................. 11-266542

(51) Int. Cl.
*H04N 5/232* (2006.01)

(52) U.S. Cl. .................................. 348/351; 348/219.1

(58) Field of Classification Search ................ 348/335, 348/359, 219.1, 373, 374, 375, 351
See application file for complete search history.

(56) References Cited

U.S. PATENT DOCUMENTS

| | | | |
|---|---|---|---|
| 5,424,835 A * | 6/1995 | Cosnard et al. ............. | 356/606 |
| 5,642,223 A | 6/1997 | Hasushita et al. | |
| 6,072,529 A * | 6/2000 | Mutze ......................... | 348/351 |
| 6,285,400 B1 * | 9/2001 | Hokari ........................ | 348/374 |
| 6,318,912 B1 * | 11/2001 | Shono et al. ................ | 396/342 |
| 6,381,024 B1 * | 4/2002 | Marcus et al. .............. | 396/268 |
| 6,639,625 B1 * | 10/2003 | Ishida et al. ............. | 348/219.1 |

* cited by examiner

*Primary Examiner*—David Ometz
*Assistant Examiner*—Gevell Selby
(74) *Attorney, Agent, or Firm*—Greenblum & Bernstein, P.L.C.

(57) ABSTRACT

A digital camera includes a photographic lens that is provided on a camera body of the digital camera so that an optical axis of the photographic lens is stationary with respect to the camera body; an image pick-up element on which an image of an object to be photographed, which is formed through the photographic lens, is impinged; and a tilting/swinging mechanism, provided in the camera body, for tilting and/or swinging the image pick-up element relative to a plane orthogonal to the optical axis.

16 Claims, 2 Drawing Sheets

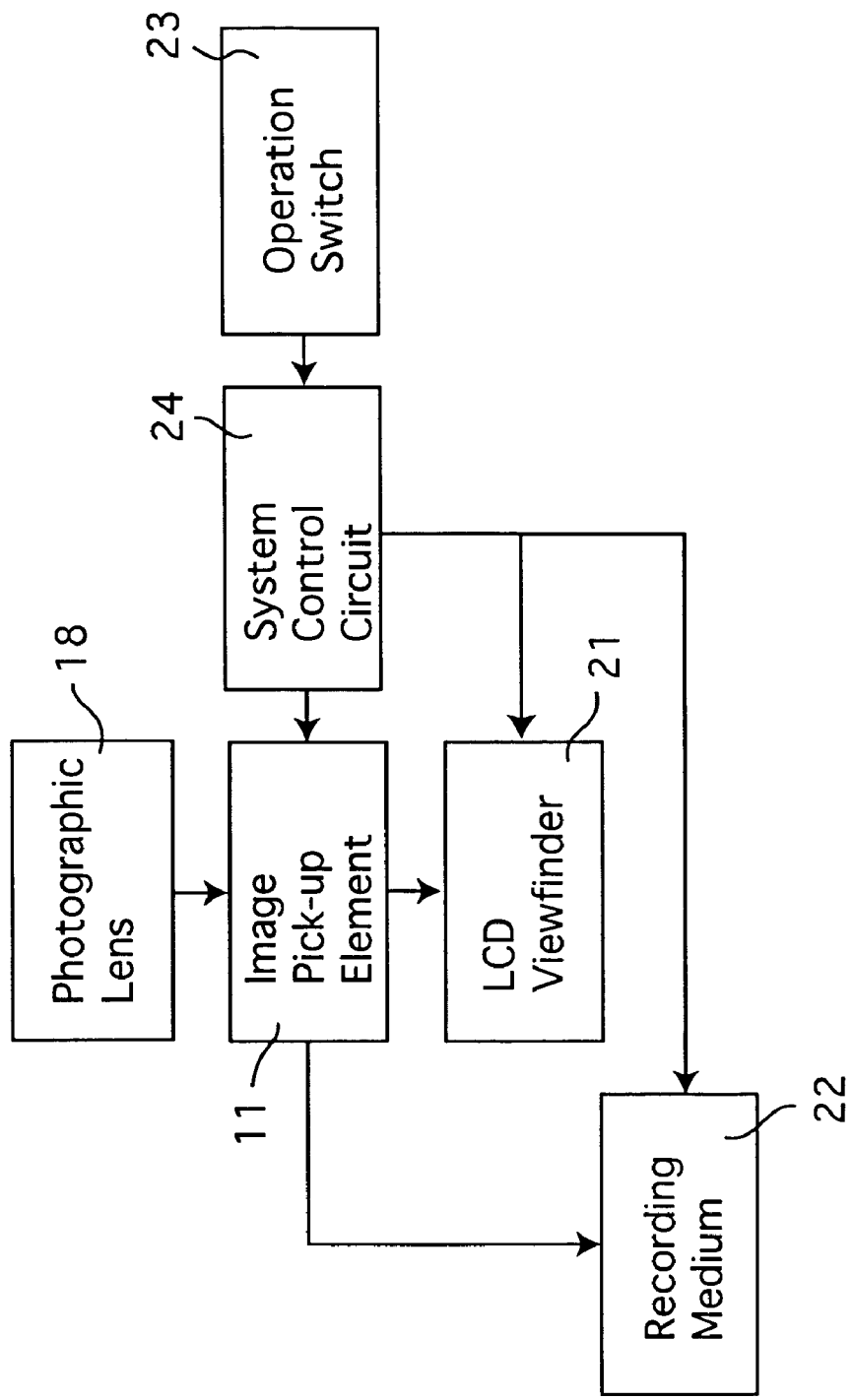

DIGITAL CAMERA HAVING A TILTING/SWINGING MECHANISM

BACKGROUND OF THE INVENTION

1. Field of the Invention

The present invention relates to a digital camera provided with a tilting/swinging mechanism.

2. Description of the Related Art

In conventional tilting/swinging photography with a camera using sensitive film, the photographic lens is moved (tilted or swung) relative to the camera body in which the sensitive film is fixedly positioned. More specifically, conventional tilting/swinging photography with a camera using sensitive film is known for being able to sharply focus entirely on a surface of an object which is inclined to a plane orthogonal to the optical axis of the photographic lens by tilting or swinging the optical axis of the photographic lens relative to the direction normal to the film plane. In theory, the camera can be sharply focused entirely on a surface of an object which is inclined to a plane orthogonal to the optical axis of the photographic lens by making the extended surface of the film surface, the extended surface of the object surface, and the extended surface of a lens surface intersect one another along a straight line, according to the Scheimpflug principle.

In such conventional tilting/swinging photography, it is necessary to use a complicated mechanism for tilting or swinging the lens mount plate to which the photographic lens is fixed relative to the camera body, which inevitably increases the size of the camera body. In the case of performing the tilting/swinging photography with a digital camera, if the tilting/swinging mechanism designed for a camera using sensitive film is applied to the digital camera, the image plane tends to move largely relative to the sensitive surface of the image pick-up device (e.g., a CCD) of the digital camera, because the image pick-up device is generally smaller than a film surface (the sensitive surface of a film frame).

SUMMARY OF THE INVENTION

It is an object of the present invention to provide a digital camera having a simple tilting/swinging mechanism which does not increase the size of the camera body, and makes it possible to perform tilting/swinging photography with little movement of the image plane relative to the sensitive surface of the image pick-up device of the digital camera.

To achieve the object mentioned above, according to the present invention, a digital camera is provided, including a photographic lens that is provided on a camera body of the digital camera so that an optical axis of the photographic lens is stationary with respect to the camera body; an image pick-up element on which an image of an object formed by the photographic lens, is impinged; and a tilting/swinging mechanism, provided in the camera body, wherein the tilting/swinging mechanism can cause a tilting or (and) swinging movement of the image pick-up element relative to a plane orthogonal to the optical axis.

Preferably, the tilting/swinging mechanism is designed so that the image pick-up element can be operated to rotate about a point of intersection between the optical axis and a sensitive surface of the image pick-up element.

In an embodiment, the tilting/swinging mechanism includes a mount to which the image pick-up element is fixed, the mount having a convex surface; and a base fixed to the camera body, the base having a concave surface having a radius of curvature corresponding to a radius of curvature of the convex surface. The mount is mounted on the base with the convex surface being slidable on the concave surface. Preferably, the tilting/swinging mechanism further includes an operation member which is fixed to the mount so that the mount can be moved relative to the base by operating the operation member.

In an embodiment, the tilting/swinging mechanism includes amount to which the image pick-up element is fixed, the mount having a convex spherical surface having a center coincident with a point of intersection between the optical axis and a sensitive surface of the image pick-up element; and a base fixed to the camera body, the base having a concave spherical surface having a radius of curvature corresponding to a radius of curvature of the convex spherical surface. A sliding movement of the convex spherical surface on the concave spherical surface causes the image pick-up element to rotate about the point of intersection. Preferably, an operation member is provided, which is fixed to the mount so that the mount can be moved relative to the base by operating the operation member.

According to another aspect of the present invention, a digital camera is provided, having a photographic lens and an image pick-up element, the photographic lens being provided on a camera body of the digital camera so that an optical axis of the photographic lens is stationary with respect to the camera body, an image of an object to be photographed being impinged on the image pick-up element through the photographic lens, the digital camera includes a tilting/swinging mechanism, provided in the camera body, wherein the tilting/swinging mechanism can cause a tilting or (and) swinging movement of a sensitive surface of the image pick-up element relative to a plane orthogonal to the optical axis. The tilting/swinging mechanism includes a movable member to which the image pick-up element is fixed, and a stationary member to which the movable member is connected so that the movable member can move relative to the stationary member so as to tilt or swing the image pick-up element relative to the plane.

The present disclosure relates to subject matter contained in Japanese Patent Application No. 11-266542 (filed on Sep. 21, 1999) which is expressly incorporated herein by reference in its entirety.

BRIEF DESCRIPTION OF THE DRAWINGS

The invention will be discussed below in detail with reference to the accompanying drawings, in which:

FIG. 3 is a block diagram of an image pick-up system of the digital camera shown in FIG. 2.

DESCRIPTION OF THE PREFERRED EMBODIMENT

Figure 1:
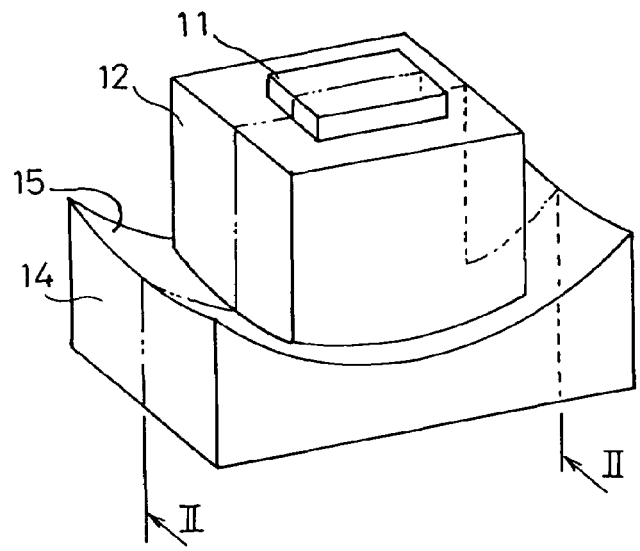
FIG. 1 is a perspective view of fundamental elements, which support an image pick-up device, of an embodiment of a tilting/swinging mechanism according to the present invention.

An embodiment of a digital camera according to the present invention is provided with an image pick-up system shown in FIG. 3. As shown in FIG. 3, this system includes an image pick-up element (e.g., a CCD) 11, a photographic lens 18, an LCD viewfinder 21, a recording medium (e.g., an internal memory) 22, an operation switch 23 and a system control circuit 24. An object image is focused on the sensitive surface of the image pick-up element 11 through the photographic lens 18. The image pick-up element 11 converts the object image focused on the sensitive surface thereof into a picture signal. In accordance with an operation of the operation switch 23, the system control circuit 24 selects either a finder mode, in which the picture signal is viewed through the LCD viewfinder 21, or a photographing mode, in which the picture signal is recorded in the recording medium 22.

Figure 2:
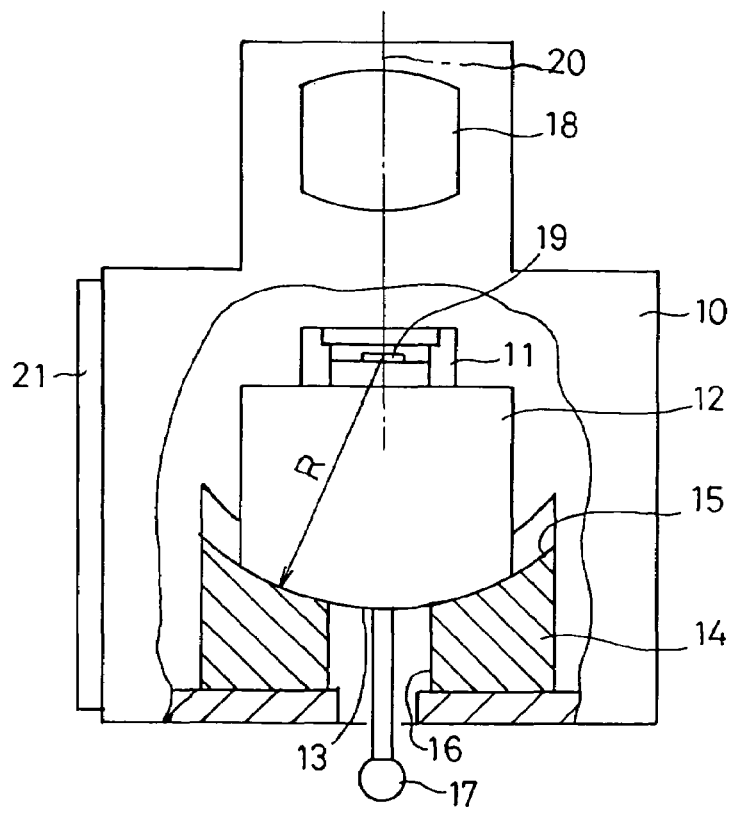
FIG. 2 is a schematic sectional view of a digital camera having the tilting/swinging mechanism shown in FIG. 1, taken along the line II—II in FIG. 1.

FIG. 2 is a schematic sectional view of a digital camera of the present embodiment according to the present invention. The digital camera is not provided with a mechanism for tilting or swinging the photographic lens 18 relative to the camera body 10. The photographic lens 18 is supported by the camera body 10 so that the optical axis 20 of the photographic lens 18 is stationary with respect to the camera body 10.

The image pick-up element 11, which is positioned behind the photographic lens 18 (below the photographic lens 18 as viewed in FIG. 2), is fixed to a front face (top face as viewed in FIG. 2) of a mount (movable member) 12 at a position where an image formed through the photographic lens 18 is focused on the sensitive surface 19 of the image pick-up element 11. The image obtained through the image pick-up element 11 can be seen through the LCD viewfinder 21.

The mount 12 is provided on the rear face thereof with a convex spherical surface 13 having a center coincident with the intersection between the optical axis 20 and the sensitive surface 19 of the image pick-up element 11. The convex spherical surface 13 has a radius of curvature "R" as shown in FIG. 2. The mount 12 is mounted on a base (stationary member) 14 fixed to the camera body 10. The base 14 is provided on the front face thereof with a concave spherical surface 15 whose radius of curvature is identical to that of the convex spherical surface 13. Accordingly, the mount 12 is mounted on the base 14 with the convex spherical surface 13 being slidable on the concave spherical surface 15.

FIG. 1 is a perspective view of the image pick-up element 11, the mount 12 and the base 14 on which the mount 12 is mounted to be slidable thereon, showing the positional relationship amount the image pick-up element 11, the mount 12 and the base 14. The mount 12 is slidably mounted on the base 14 so as not to come off the base 14 by attracting the mount 12 on the base 14 by, for example, magnetic or spring force. The rear face of the base 14 is secured to the camera body 10. As can be seen in FIG. 2, a through hole 16 is formed between the base 14 and the camera body 10 to extend rearward from the concave spherical surface 15 to the outside of the camera body 10. The mount 12 is provided with an operation stick (operation member) 17 which extends rearward from substantially the center of the convex spherical surface 13 to project to the outside of the camera body 10 via the through hole 16. The mount 12 can be moved (tilted and/or swung) relative to the camera body 10 by operating the operation stick 17 from the outside of the camera body 10. The mount 12, the base 14 and the operation stick 17 constitute a tilting/swinging mechanism.

Upon a photographic operation, first of all the user views the object through the LCD viewfinder 21. When it is necessary to carry out the tilting/swinging operation so as to adjust perspective and depth of field, the user operates the operation stick 17 to tilt the sensitive surface 19 of the image pick up element 11 relative to the optical axis 20 horizontally and/or vertically while viewing the object through the LCD viewfinder 21. During this tilting/swinging operation, the sensitive surface 19 of the image pick-up element 11 rotates about the center of the sensitive surface 19, namely, tilts relative to a plane orthogonal to the optical axis 20 without varying the position of the center of the sensitive surface 19 relative to the camera body 10. Therefore, the image pick-up element 11 can be tilted relative to the optical axis 20 horizontally and vertically without varying the position of the point of intersection between the optical axis 20 and the sensitive surface 19 of the image pick-up element 11. After this tilting/swinging operation is completed, a picture is taken in a photographing mode, which is selected via the operation switch 23.

In the illustrated embodiment, although the mount 12 is provided with a spherical surface (the convex spherical surface 13) while the base 14 is provided with a corresponding spherical surface (the concave spherical surface 15) so that the image pick-up element 11 can tilt to various angles without varying the position of the center of the sensitive surface 19 relative to the camera body 10, the present invention is not limited solely to this particular embodiment. For instance, the mount 12 can be provided with a cylindrical surface (e.g., a convex cylindrical surface) while the base 14 can provided with a corresponding cylindrical surface (e.g., a concave cylindrical surface) so that the image pick-up element 11 can tilt either only horizontally (i.e., swing) or only vertically (i.e., tilt) without varying the position of the center of the sensitive surface 19 relative to the camera body 10.

As can be understood from the foregoing, according to a digital camera having a tilting/swinging mechanism to which the present invention is applied, a tilting/swinging mechanism having a simple structure can be obtained.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera comprising:
   a photographic lens provided on a camera body of the digital camera, the photographic lens defining an optical axis that is stationary with respect to the camera body;
   an image pick-up element on which an image formed by the photographic lens images, the image pick-up element comprising a sensitive surface that intersects the optical axis at an intersection point;
   a tilting/swinging mechanism, provided in the camera body, that enables concurrent compound movement of the image pick-up element, relative to the optical axis, in at least two orthogonal planes such that the sensitive surface rotates about the intersection point, said tilting/swinging mechanism being configured to enable the concurrent compound movement of the image pick-up device by a single operation member.

2. The digital camera according to claim 1, the tilting/swinging mechanism comprising:
   a mount to which the image pick-up element is fixed, the mount comprising a convex surface; and
   a base, fixed to the camera body, comprising a concave surface having a radius of curvature corresponding to a radius of curvature of the convex surface;
   wherein the mount is mounted on the base such that the convex surface is slidable on the concave surface.

3. The digital camera according to claim 2, the tilting/swinging mechanism further comprising an operation member fixed to the mount, enabling movement of the mount relative to the base.

4. The digital camera according to claim 1, the tilting/swinging mechanism comprising:
   a mount to which the image pick-up element is fixed, the mount comprising a convex spherical surface which defines a portion of a sphere having a center point coincident with the intersection point between the optical axis and the sensitive surface of the image pick-up element; and
   a base, fixed to the camera body, comprising a concave spherical surface having a radius of curvature corresponding to a radius of curvature of the convex surface, the mount being mounted on the base such that the convex spherical surface is slidable on the concave spherical surface;
   wherein a sliding movement of the convex spherical surface on the concave spherical surface causes the sensitive surface of the image pick-up element to rotate about the intersection point.

5. The digital camera according to claim 4, further comprising an operation member, fixed to the mount, that enables movement of the mount relative to the base.

6. The digital camera according to claim 1, wherein the intersection point is stationary with respect to the camera body.

7. The digital camera according to claim 1, wherein the concurrent compound movement of the image pick-up element enabled by the tilting/swinging mechanism comprises spherical movement.

8. The digital camera according to claim 1, wherein the concurrent compound movement of the image pick-up element enabled by the tilting/swinging mechanism comprises skewing movement relative to two orthogonal planes.

9. The digital camera according to claim 1, said tilting/swinging mechanism comprising a convex spherical surface and a concave spherical surface mounted for relative slidable motion therebetween.

10. A digital camera having a photographic lens and an image pick-up element, the photographic lens being attached to a camera body of the digital camera such that an optical axis of the photographic lens is stationary with respect to the camera body, an image of an object to be photographed impinging on the image pick-up element through the photographic lens, the digital camera comprising:
   a tilting/swinging mechanism, provided in the camera body, configured to at least one of tilt and swing a sensitive surface of the image pick-up element by concurrent compound movement, in at least two orthogonal planes, relative to the optical axis,
   wherein the tilting/swinging mechanism comprises:
      a movable member to which the image pick-up element is fixed; and
      a stationary member to which the movable member is rotatably connected to enable the movable member to move relative to the stationary member to enable at least one of tilting and swinging the sensitive surface relative to a point at which the sensitive surface intersects the optical axis, said tilting/swinging mechanism being configured to enable the concurrent compound movement of the image pick-up device by a single operation member.

11. The digital camera according to claim 10, wherein the point at which the sensitive surface intersects the optical axis remains stationary with respect to the camera body.

12. The digital camera according to claim 10, wherein the concurrent compound movement of the image pick-up element enabled by the tilting/swinging mechanism comprises spherical movement.

13. The digital camera according to claim 10, wherein the concurrent compound movement of the image pick-up element enabled by the tilting/swinging mechanism comprises skewing movement relative to two orthogonal planes.

14. The digital camera according to claim 10, said tilting/swinging mechanism comprising a convex spherical surface and a concave spherical surface mounted for relative slidable motion therebetween.

15. A digital camera comprising:
   a photographing lens attached to a camera body, the photographing lens defining an optical axis that is stationary with respect to the camera body;
   an image pick-up element comprising a sensitive surface that intersects the optical axis at an intersection point;
   a rotatable mount having the image pick-up element attached to one side and defining a convex spherical surface on an opposite side, a radius of the convex spherical surface being centered on the intersection point; and
   a base, fixed to the camera body, defining a concave spherical surface that slidably cooperates with the convex spherical surface of the rotatable mount;
   wherein movement of the rotatable mount with respect to the base rotates the sensitive surface around the intersection point.

16. The digital camera according to claim 15, wherein the intersection point is stationary with respect to the camera body.

* * * * *